(12) United States Patent
Yamada et al.

(10) Patent No.: US 9,744,607 B2
(45) Date of Patent: Aug. 29, 2017

(54) POWER SUPPLY SYSTEM FOR WIRE ELECTRIC DISCHARGE MACHINING

(75) Inventors: Kuniharu Yamada, Kanagawa (JP); Tomoyuki Yanagisawa, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 989 days.

(21) Appl. No.: 13/810,893

(22) PCT Filed: Jul. 21, 2011

(86) PCT No.: PCT/JP2011/066620
§ 371 (c)(1),
(2), (4) Date: Jan. 18, 2013

(87) PCT Pub. No.: WO2012/011545
PCT Pub. Date: Jan. 26, 2012

(65) Prior Publication Data
US 2013/0112659 A1    May 9, 2013

(30) Foreign Application Priority Data

Jul. 21, 2010 (JP) .................................. 2010-163643

(51) Int. Cl.
*B23H 7/00* (2006.01)
*B23H 1/02* (2006.01)
(Continued)

(52) U.S. Cl.
CPC .................. *B23H 1/02* (2013.01); *B23H 7/04* (2013.01); *B23H 7/101* (2013.01)

(58) Field of Classification Search
CPC ... B23H 1/02; B23H 1/023; B23H 5/00–5/04; B23H 7/00; B23H 7/04;
(Continued)

(56) References Cited

U.S. PATENT DOCUMENTS 4,667,077 A * 5/1987 Goto ........................ 219/69.12
5,147,995 A    9/1992 Chung et al.
(Continued)

FOREIGN PATENT DOCUMENTS

JP    64-027818    1/1989
JP    07-276142    10/1995
(Continued)

OTHER PUBLICATIONS

Translation of Oizumi et al. Reference (located in Oizumi document).*
(Continued)

*Primary Examiner* — Quang D Thanh
*Assistant Examiner* — Brandon Harvey
(74) *Attorney, Agent, or Firm* — Jianq Chyun IP Office (57) ABSTRACT

A power supply system for wire electric discharge machining includes a first power supply circuit and a second power supply circuit. The first power supply circuit applies, to the machining gap, a voltage that induces a discharge. The second power supply circuit, which includes a low inductance line, supplies a current, which contributes to the machining, to the machining gap,. A blocking diode is series-connected between the low inductance line and the machining gap. A container, which has a contact surface contacting with the blocking diode and contains a cooling liquid, is provided.

4 Claims, 7 Drawing Sheets (51) Int. Cl.
*B23H 7/04* (2006.01)
*B23H 7/10* (2006.01)

(58) Field of Classification Search
CPC ......... B23H 7/101; B23H 7/14; H01L 23/473;
H05K 7/20218; H05K 7/20254
USPC .... 165/80.4–80.5, 104.33; 219/69.12, 69.13,
219/69.18; 361/677, 699, 702
See application file for complete search history.

(56) References Cited

U.S. PATENT DOCUMENTS

| | | | |
|---|---|---|---|
| 5,166,489 A * | 11/1992 | Huff et al. | 219/69.12 |
| 6,107,593 A * | 8/2000 | Tsai et al. | 219/69.13 |
| 2009/0116198 A1* | 5/2009 | McKeown et al. | 361/720 |

FOREIGN PATENT DOCUMENTS

| | | | |
|---|---|---|---|
| JP | 07276142 A | * | 10/1995 |
| JP | 10-075564 | | 3/1998 |
| JP | 2001-300820 | | 10/2001 |
| JP | 2008-173139 | | 7/2008 |

OTHER PUBLICATIONS

"Search Report of European Counterpart Application", issued on May 16, 2014, p. 1-p. 6.

* cited by examiner

FIG.8

POWER SUPPLY SYSTEM FOR WIRE ELECTRIC DISCHARGE MACHINING

CROSS-REFERENCE TO RELATED APPLICATION

This application is a 371 of international application of PCT application Ser. No. PCT/JP2011/066620, filed on Jul. 21, 2011, which claims the priority benefit of Japan application no. 2010-163643, filed on Jul. 21, 2010. The entirety of each of the above-mentioned patent applications is hereby incorporated by reference herein and made a part of this specification.

TECHNICAL FIELD

The present invention relates to a wire electric discharge machining apparatus for machining a work piece by causing electric discharge to a machining gap formed between a wire electrode and the work piece. In particular, the present invention relates to a power supply system for wire electric discharge machining which supplies a current pulse to the machining gap at a high frequency.

BACKGROUND TECHNIQUE

In general, when a current pulse of large energy is supplied to a machining gap at a high frequency, the material removal rate in electric discharge machining is improved. Meanwhile, the current pulse is desirable to have a high current peak, a steep rising edge and a steep falling edge. A typical wire electrode is made from brass and has a diameter of between 0.07 mm and 0.30 mm. During the machining, a predetermined tension is applied to the wire electrode. When a large current suddenly flows through such a wire electrode, the wire electrode has a risk of breaking.

In order to avoid such a risk, a power supply system, which includes a first power supply circuit and a second power supply circuit, is known. The first power supply circuit applies a high voltage to a degree that induces the electric discharge to a machining gap, but limits the current supplied to the machining gap to be as small as possible. The first power supply circuit has a first DC (direct current) power supply and a current limiting resistor with a large resistance value. The second power supply circuit supplies a large current to the machining gap as soon as the electric discharge is generated by the first power supply circuit. The second power supply circuit includes a second DC power supply and a low inductance line connecting the second DC power supply to the machining gap. A resistance component and an inductance component are minimized in the second power supply circuit.

Figure 8:
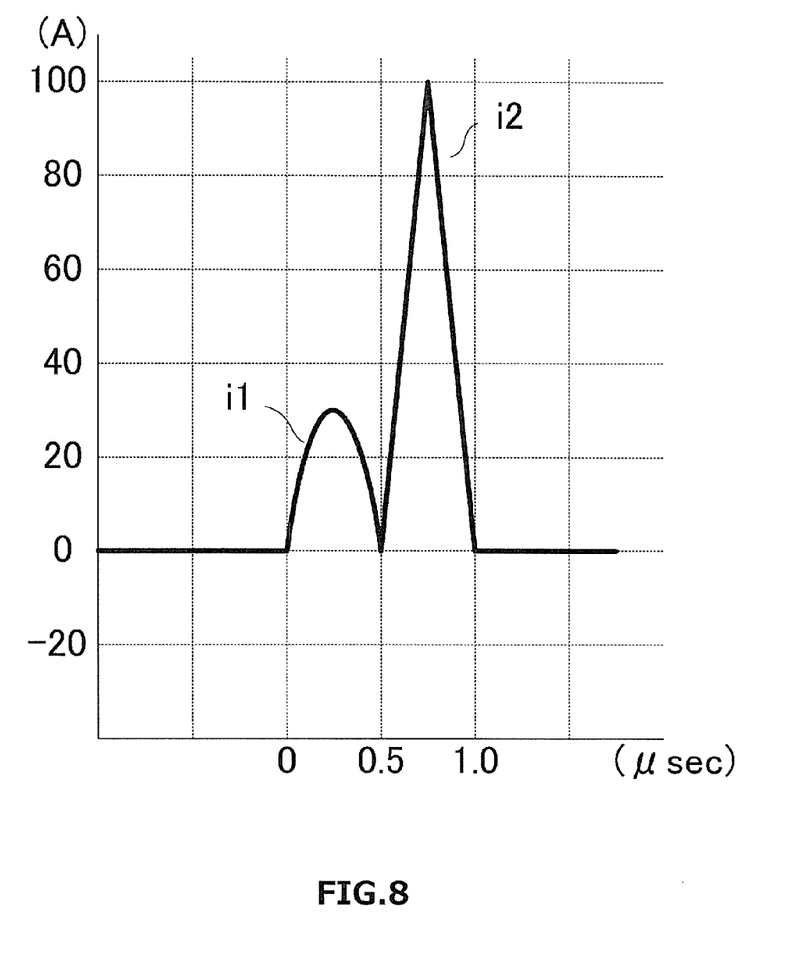
FIG. 8 is a waveform chart illustrating a typical current pulse when a current flows from a floating capacitor to a machining gap.

FIG. 8 illustrates a typical current pulse flowing in a machining gap. A part of current i1 is supplied from the first power supply circuit. The first power supply circuit supplies a current as small as possible to the machining gap. However, the current flows into the machining gap from an unintentional floating capacitor that is generated on the low inductance line in the second power supply circuit. This current forms a part of current i1. A current i2 is supplied from the second power supply circuit. It is known that the wire electrode made from brass is melted and copper is precipitated when the current pulse in FIG. 8 is supplied to the machining gap. As the copper is attached to the work piece, the material removal rate of the work piece is significantly decreased. The larger the current i1 is, the more the copper is attached to the work piece.

When a voltage is applied to the machining gap from the DC power supply of the first power supply circuit, a rise in the voltage becomes slow due to the floating capacitor in the low inductance line. In other words, the rising edge of the voltage becomes blunt. Therefore, a delay time from applying the voltage in the machining gap for generating the electric discharge becomes longer. At this point, the material removal rate of the work piece significantly decreases.

The patent document 1 disclosed a wire electric discharge machining apparatus in which a power supply circuit for rough machining is connected to a machining gap through a low inductance line and a power supply circuit for finish machining is connected to the machining gap through a low capacitance line. A blocking diode is disposed between the inductance line and the machining gap. The blocking diode prevents a current from flowing from a floating capacitor in the inductance line to the machining gap.

The patent document 2 disclosed a power supply apparatus for an electric discharge machine in which a main power supply is connected to a machining gap through a low inductance line and an auxiliary power supply is connected to the machining gap through the low capacitance line. A blocking diode is disposed between the inductance line and the machining gap, and a reverse bias power supply is series-connected to the blocking diode. When rough machining is performed, a large current is supplied to the machining gap from the main power supply immediately after the electric discharge is generated by a voltage of the auxiliary power supply. When the finish machining is performed, a small current is supplied to the machining gap from the auxiliary power supply. It is mentioned that the blocking diode and the reverse bias power supply considerably decrease an effect of the floating capacitor in the low inductance line when the finish machining is performed.

PRIOR ART DOCUMENTS

Patent Documents

Patent Document 1: Japanese Patent-Laid Open No. H01-027818
Patent Document 2: Japanese Patent-Laid Open No. H07-276142

SUMMARY OF THE INVENTION

Issue to be Solved by the Invention

An object of the present invention is to provide a power supply system for a wire electric discharge machining apparatus that an effect of a floating capacitor in a low inductance line can be sufficiently decreased with a simple circuit structure.

Means for Solving the Issues

One aspect of the invention relates to a power supply system for wire electric discharge machining which supplies a current pulse to a machining gap formed between a wire electrode and the work piece. The power supply system for wire electric discharge machining includes a first DC power supply and a current limiting resistor that is series-connected to the first DC power supply and that limits a current flowing through the machining gap to be as small as possible, and includes a first power supply circuit for applying a voltage, which induces an electric discharge, to the machining gap. The power supply system for wire electric discharge machining further includes a second DC power supply and a low inductance line connecting the second DC power supply to the machining gap, and includes a second power supply circuit for supplying a current, which contributes to the electric discharge machining, to the machining gap. The power supply system for wire electric discharge machining further includes a blocking diode that is series-connected between the low inductance line and the machining gap, and a container that has a contact surface contacting with the blocking diode and contains cooling liquid.

A snubber circuit may be parallel-connected to the blocking diode. A silicon paste may be disposed between the blocking diode and the contact surface.

The power supply system for wire electric discharge machining may further include a machining tank having a through hole, a mounting plate that is disposed in the machining tank and for fixing the work piece, a conductor block that passes through the through hole and is electrically connected to the mounting plate. The blocking diode can be mounted to the conductor block.

The contact surface on the container is preferred to have a large area to a degree that can make contact with nearly the entire area of the largest flat plane of the blocking diode.

DESCRIPTION OF PREFERRED EMBODIMENTS

Figure 1:
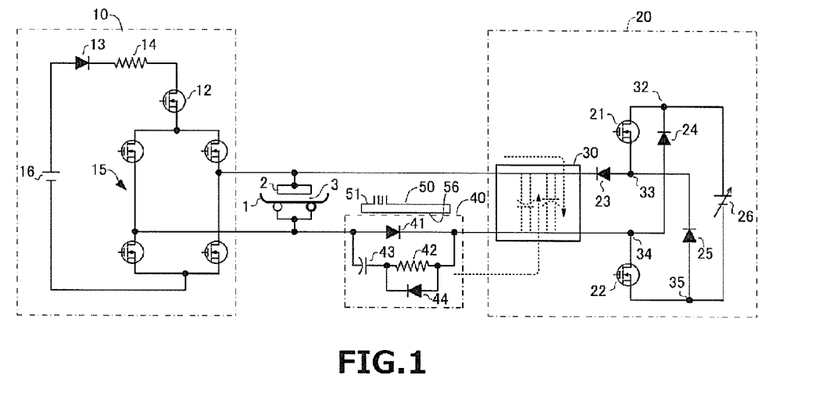
FIG. 1 is a circuit diagram illustrating an example of a power supply system of the present invention.

Referring to FIGS. 1, 2, 3, 4, 5 and 6, an embodiment of the present invention is explained as a power supply system for wire electric discharge machining. One example of the power supply system is shown in FIG. 1. The power supply system supplies a power pulse repeatedly to a machining gap 3 formed between a wire electrode 1 and a work piece 2. The wire electrode 1 made from brass is an electrode of one side and a tool for electric discharge machining. The work piece 2 is an electrode of the other side and consists of iron material or cemented carbide.

The power supply system includes a first power supply circuit 10 and a second power supply circuit 20. The power supply circuits 10, 20 are, unavoidably, disposed physically away from the machining gap 3. The power supply circuits 10, 20 are contained in a housing, for example. The first power supply circuit 10 applies a voltage for inducing the electric discharge to the machining gap 3 and supplies a current that is as small as possible without disconnecting the wire electrode 1.

The first power supply circuit 10 includes a serial circuit of a DC power supply 16, a switching element 12, a reverse blocking diode 13 and a current limiting resistor 14. The first power supply circuit 10 further comprises a polarity switching circuit 15 comprising a transistor bridge. An output voltage of the DC power supply 16 is high enough to induce the electric discharge to the machining gap 3. The voltage, which is high enough to induce the electric discharge, depends on the size of the machining gap 3. The higher the voltage being applied to the machining gap 3 is, the larger a resistance of the current limiting resistor 14 is necessary; as a result, an energy loss becomes larger.

The switching element 12 is turned on/off in response to a gate signal supplied by a pulse control device (not shown). The pulse control device conducts the switching element 12 after a predetermined off-time and makes the switching element 12 non-conducting immediately after detecting an electric discharge is generated. The switching element 12 generates the electric discharge repeatedly to the machining gap 3 by repeating being on and off. The reverse blocking diode 13 protects the switching element 12 by blocking the reverse flow of the current.

The current limiting resistor 14 has a large resistance since the current flowing through the wire electrode 1 is limited to as small as possible when the electric discharge is generated to the machining gap 3. The resistance of the current limiting resistor 14 is determined according to a resistance component that exists in the output voltage of the DC power supply 16 and the electric discharge circuit.

The second power supply circuit 20 supplies a current, which is provided to the electric discharge machining, to the machining gap. The second power supply circuit 20 includes a DC power supply 26, switching elements 21, 22, a reverse blocking diode 23 and a low inductance line 30. The low inductance line 30 is, for example, a coaxial cable which has less inductance component. The resistance component and the inductance component in the second DC power supply 20 are minimized. A positive electrode of the DC power supply 26 is connected to the work piece 2 through a node 32, the switching element 21, a node 33, the reverse blocking diode 23 and the low inductance line 30. A negative electrode of the DC power supply 26 is connected to the wire electrode 1 through a node 35, the switching element 22, a node 34 and the low inductance line 30.

The DC power supply 26 can supply a large current to a degree, which is necessary for performing from the rough machining to a pre-finish machining, to the machining gap 3. The material of the work piece 2 can be mostly removed by the current from the DC power supply 26. The output voltage of the DC power supply 26 is variable and determined according to the electric machining condition.

Each of the switching elements 21, 22 comprises a field effect transistor (FET) which is serially connected to the DC power supply 26. The switching elements 21, 22 are turned on/off simultaneously or with time lag according to the gate signal supplied by a pulse control device (not shown). The switching elements 21, 22 supply a current pulse train with a predetermined on-time to the machining gap 3 by repeating the on/off switching operations. The on-time and the off-time are determined according to the settings of the electric machining condition.

The reverse blocking diode 23 blocks a reverse flow of a current supplied from the DC power supply 26 to the machining gap 3 and protects the DC power supply 26. The second power supply circuit 20 further includes diodes 24, 25 for protecting the switching elements 21, 22. The diode 24 is disposed on a circuit connecting the node 34 to the node 32. The diode 25 is disposed on a circuit connecting the node 35 to the node 33.

A current reduction circuit 40 is located between the second power supply circuit 20 and the machining gap 3. The current reduction circuit 40 suppresses the flow of the current from the floating capacitor in the low inductance line 30 to the machining gap. The current reduction circuit 40 is desirable to be disposed near the machining gap 3.

The current reduction circuit 40 comprises a blocking diode 41 and a snubber circuit. The blocking diode 41 is series-connected between the low inductance line 30 and the wire electrode 1 and suppresses the flow of the current from the floating capacitor in the low inductance line 30 to the machining gap 3. The snubber circuit comprises a protection resistor 42, a capacitor 43 and a protection diode 44.

Figure 2:
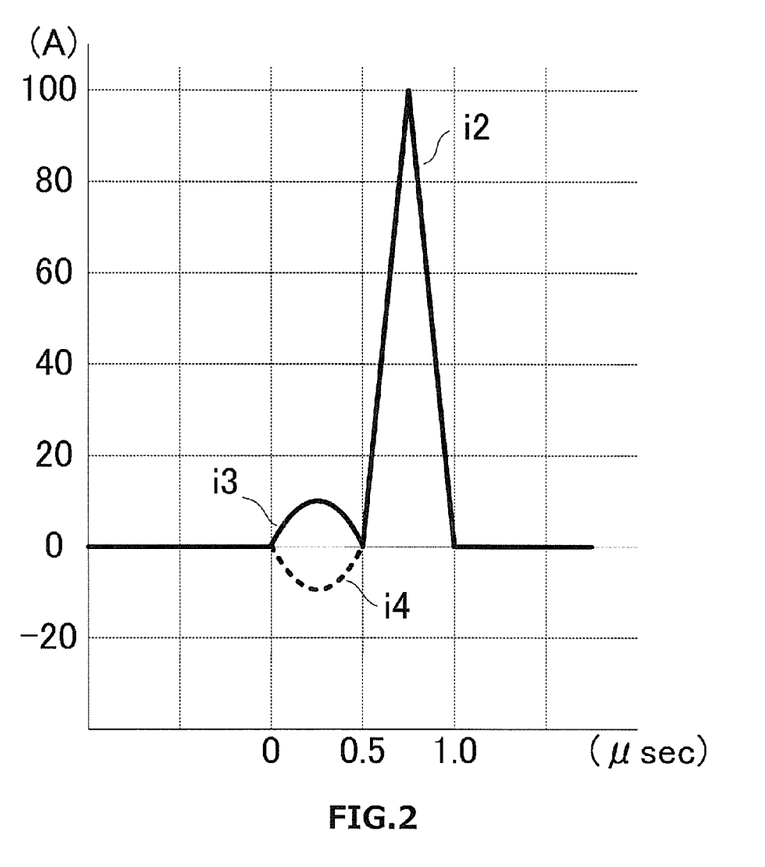
FIG. 2 is a waveform chart illustrating an example of a current pulse supplied by the power supply system in FIG. 1.
Figure 3:
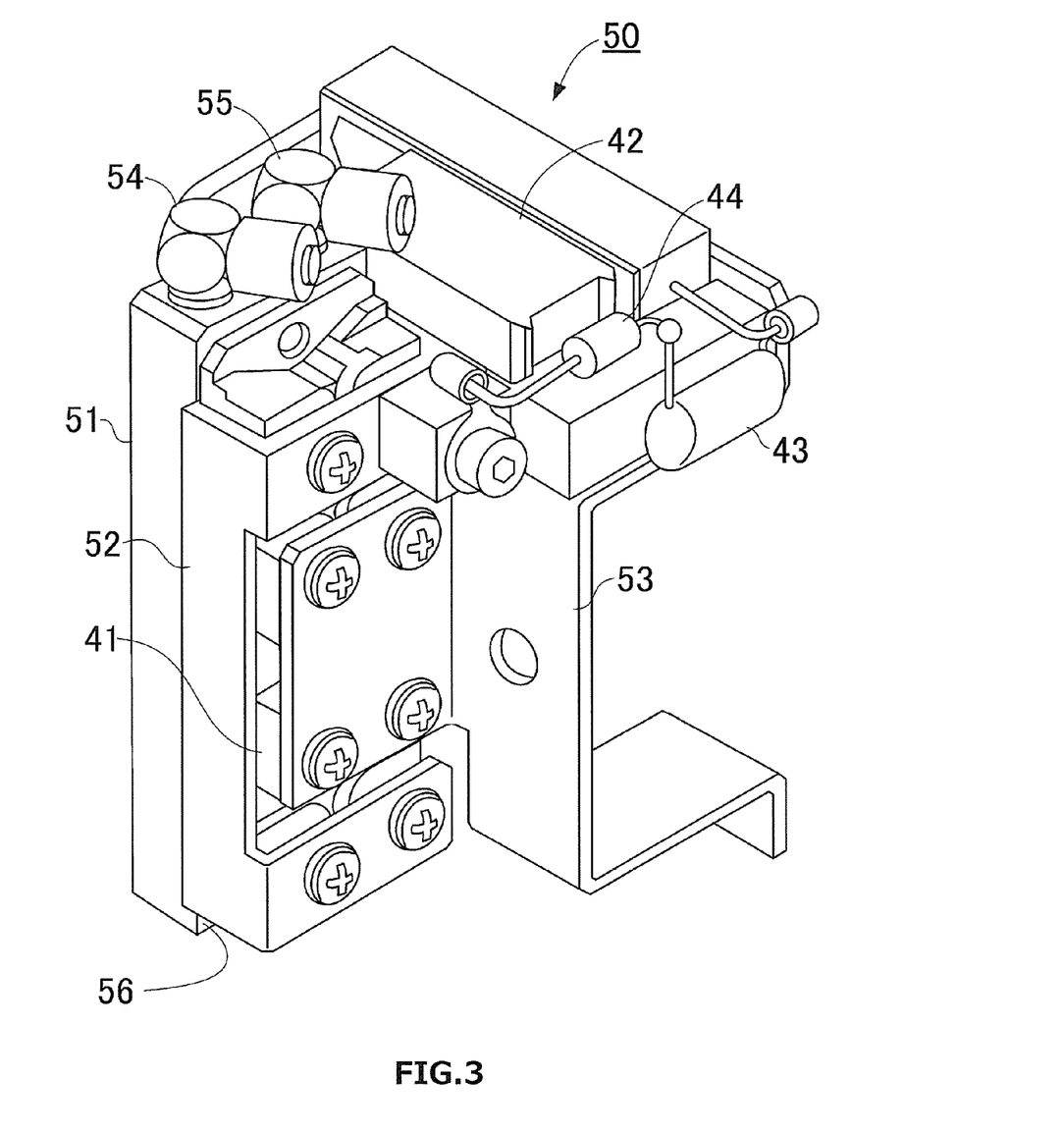
FIG. 3 is a perspective view illustrating an example of a cooling unit in FIG. 1.
Figure 4:
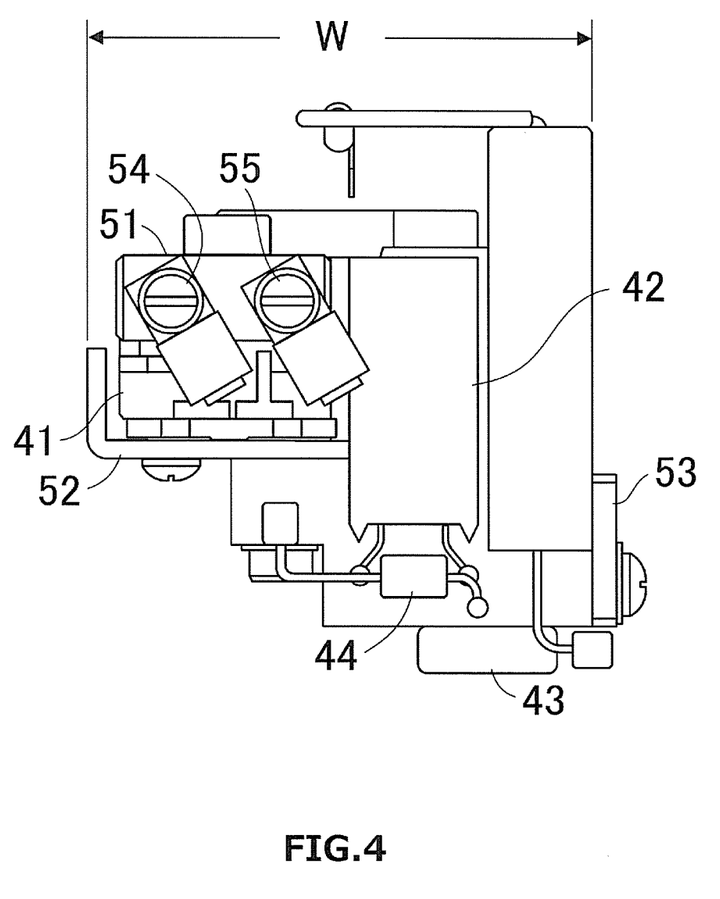
FIG. 4 is a top view illustrating an example of the cooling unit in FIG. 1.
Figure 5:
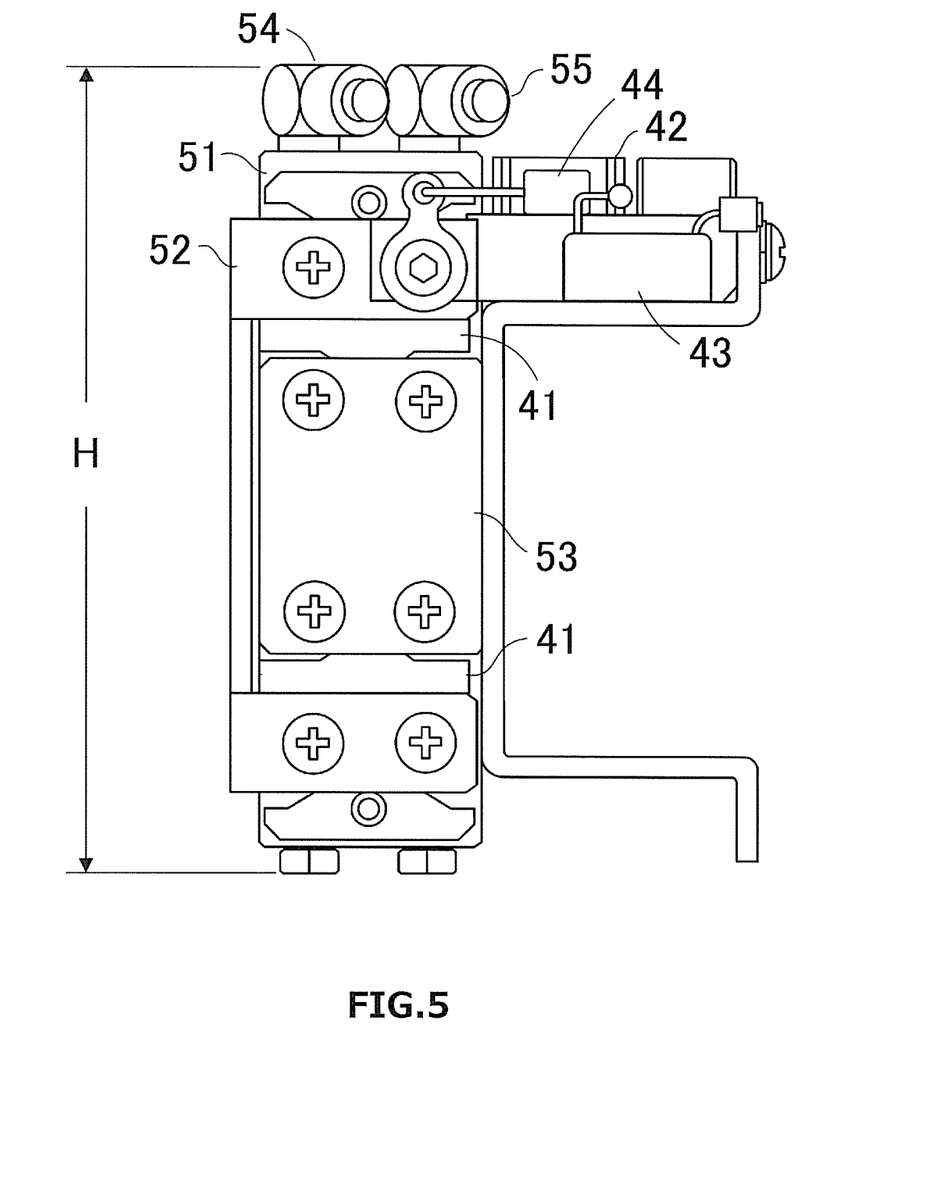
FIG. 5 is a front view illustrating an example of the cooling unit in FIG. 1.

Most of current i3 in FIG. 2 is supplied from the DC power supply 16 in the first power supply circuit 10. By the current reduction circuit 40, the current i3 is suppressed to be smaller than the current i1 in FIG. 8. As a result, the copper becomes hard to adhere on the work piece 2. In addition, since the rising edge of the current pulse is steep, the machining speed does not decrease. A dotted line i4 in FIG. 2 represents a current supplied from the DC power supply 11 by using the wire electrode 1 as a positive electrode and the work piece 2 as a negative electrode. Such switching of the polarity is performed after the pre-finish machining.

The current i2 in FIG. 2 is supplied from the DC power supply 26 in the second power supply circuit 20. When the electric discharge is generated in the machining gap 3 by applying a voltage from the DC power supply 16, a discharge detector (not shown) detects the electric discharge. The second power supply circuit 20 supplies the current i2, which contributes to the electric discharge machining, to the machining gap 3.

The snubber circuit prevents the blocking diode 41 from damage by consuming the current when a surge voltage is generated or a rush current is generated. The protection resistor 42 is parallel-connected to the blocking diode 41. The capacitor 43 is series-connected to the protection resistor 42 and parallel-connected to the blocking diode 41. The protection diode 44 is series-connected to the protection resistor 42 and parallel-connected to the blocking diode 41. A direction of the protection diode 44 is opposite to the blocking diode 41.

A cooling unit 50 cools down the blocking diode 41 by cooling liquid. The cooling liquid is a discharge working fluid of which the temperature is controlled. The discharge working fluid is a liquid comprising oil as its main component, or high specific resistance liquid. The cooling unit 50 is located as close as possible to the machining gap 3.

The cooling unit 50 includes a container 51 made from aluminum for containing the cooling liquid. The container 51 can be another material with good thermal conductivity, such as copper or stainless steel. Although aluminum has higher thermal conductivity than copper, it is lighter and is corrosion resistant in discharge working oil. If water-based working liquid is used, an inner surface of the container 51 made from aluminum is desirable to be covered with copper.

As shown in FIGS. 3, 4, 5 and 6, the cooling unit 50 includes a cathode conductor 52 and an anode conductor 53. The cathode conductor 52 conducts with a cathode of the blocking diode 41. The anode conductor 53 conducts with an anode of the blocking diode 41. The cathode conductor 52 and the anode conductor 53 comprise a folded copper plate. The anode conductor 53 provides a base which parts of the current reduction circuit 40 are installed.

The blocking diode 41 cannot be immersed directly in liquid. Therefore, the cooling unit 50 is designed to cool down the blocking diode efficiently and sufficiently although it is compact. The blocking diode 41 has a rectangular outer diameter as a whole. The blocking diode 41 has a flat plane which is the largest. The blocking diode 41 is installed in the container 51 in order to contact this plane to a contact surface 56. The contact surface 56 has a large area to a degree that can make contact with nearly the entire area of the flat plane of the blocking diode 41. The container 51 has a large capacity to a degree that cools down the blocking diode sufficiently.

The container 51 has an entrance 54 and an exit 55 for the cooling liquid. The discharge working fluid is led from the entrance 54 to the container 51 and takes heat from the blocking diode 41. The discharge working fluid of which the temperature is raised in the container 51 is drawn from the exit 55. Effluent is returned to a reservoir with a working fluid cooling device.

Figure 6:
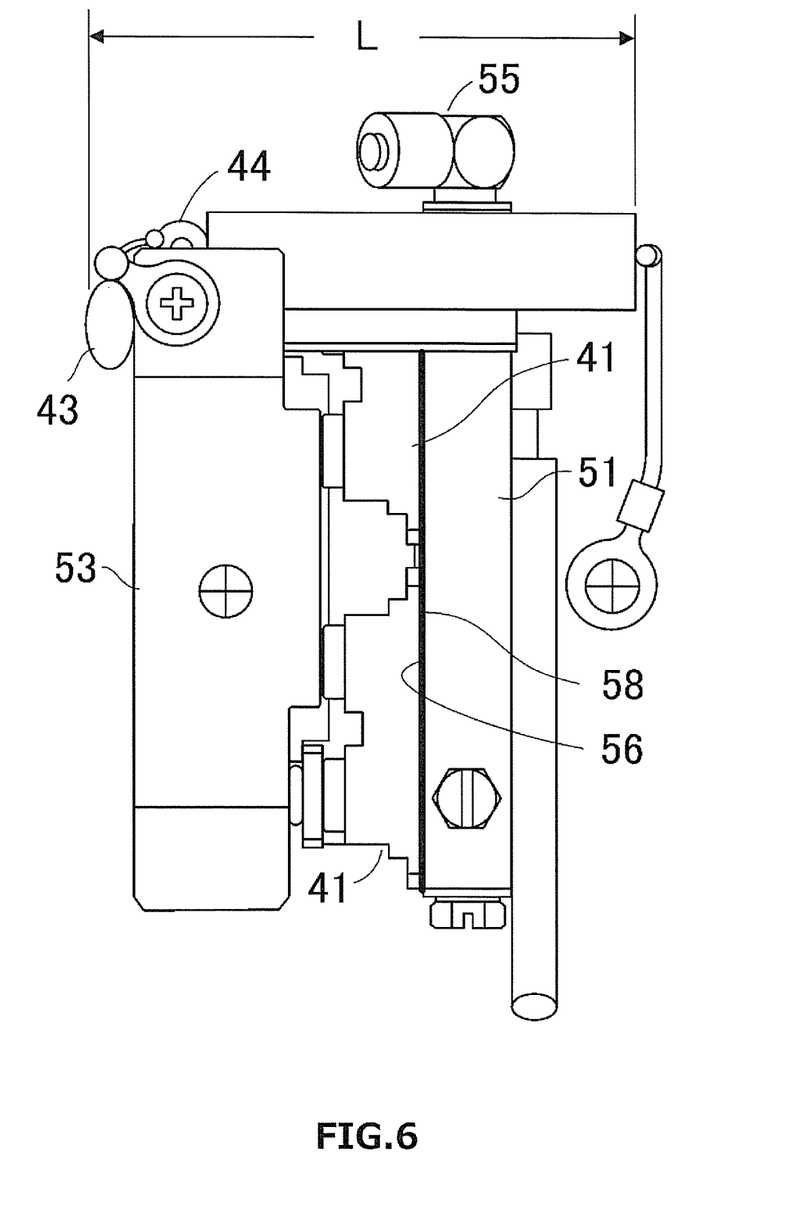
FIG. 6 is a side view illustrating an example of the cooling unit in FIG. 1.

As shown in FIG. 6, a silicon paste 58 is disposed between the blocking diode 41 and the contact surface 56 of the container 51. The silicon paste 58 can change the appearance freely by melting into a paste at a low temperature. Since the silicon paste 58 fills up a gap between the contact surface 56 and a plane of the blocking diode 41, the blocking diode 41 is completely attached to the contact surface 56. The silicon paste 58 has good thermal conductivity; therefore, a cooling effect of the blocking diode 41 is improved.

The current reduction circuit 40 comprises a few parts and is compact. The current reduction circuit 40, to which the cooling unit 50 is connected, has a width W of about 65 mm, a length L of about 67 mm and a height H of about 95 mm.

Figure 7:
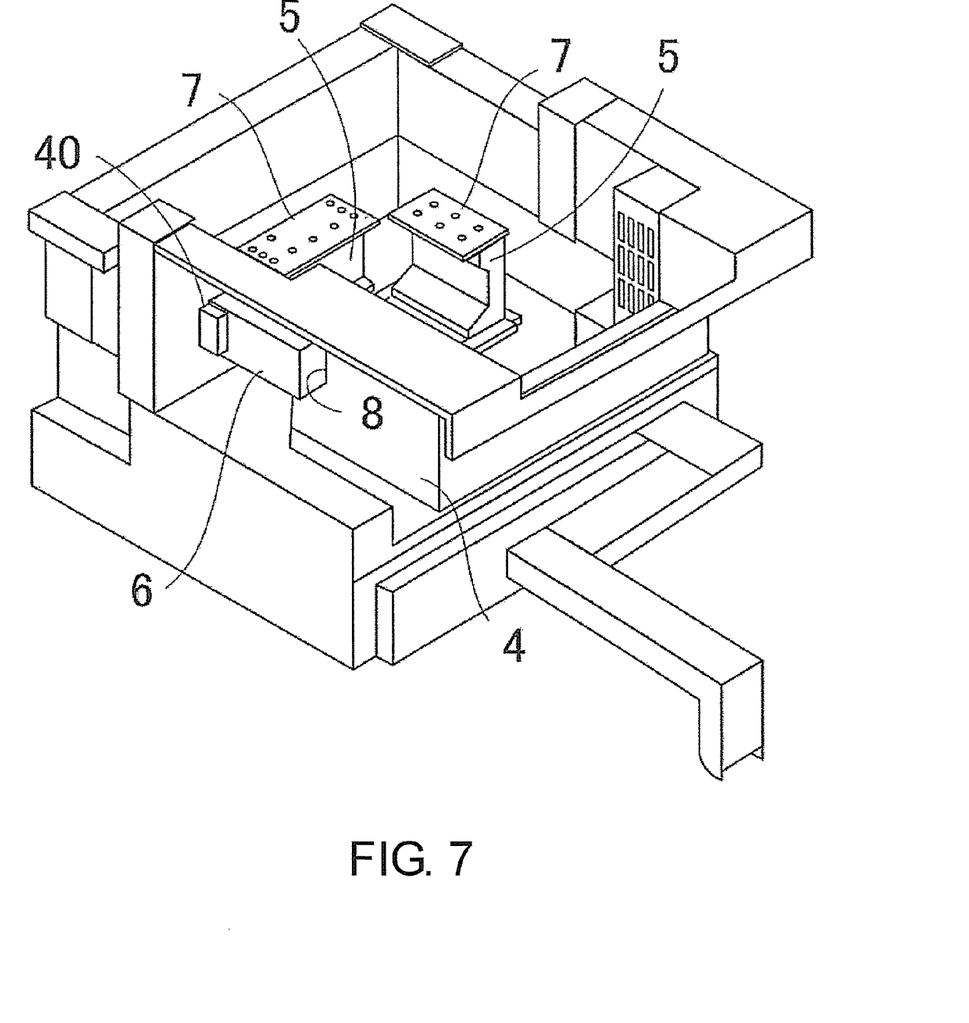
FIG. 7 is a perspective view partially illustrating a wire electric discharge machining apparatus mounting the cooling unit in FIG. 1.

FIG. 7 shows an example of an installation of the cooling unit 50. In FIG. 7, a part of the wire electric discharge machining apparatus is shown. A machining tank 4 is placed on a bed. During the machining, the machining tank 4 is filled with the discharge work piecing fluid in which the work piece 2 is immersed. A through hole 8 is formed on one side wall of the machining tank 4. A rectangular conductor block 6 passes through the through hole 8 in order to prevent it from leaking. Three mounting plates 7 made from metal for fixing the work piece 2 are disposed in the machining tank 4. The mounting plates 7 are fixed on respective insulating bases 5. The base 5 is fixed on a bottom surface of the machining tank 4. The power for discharge machining can be supplied to the work piece 2 through the mounting plates 7. The three mounting plates 7 are electrically connected by a proper metal plate or a connecting wire.

In FIG. 7, only two mounting plates 7 are shown and the third mounting plate 7 is hidden on a side wall of the machining tank 4. The conductor block 6 in the machining tank 4 is electrically connected to this third mounting plate 7 by the proper metal plate or the connecting wire. The current reduction circuit 40, to which the cooling unit 50 is connected, is mounted on the conductor block 6 on the outside of the machining tank 4. The anode conductor 53 is fixed to the conductor block 6 with a screw.

The present invention is not limited to the illustrated examples. It should be apparent to those skilled in the art that various changes and modifications to the structure of the invention may be made without departing from the spirit and scope of the invention. For example, the container for containing the cooling liquid includes a tube which allows the cooling liquid to circulate. The purpose of the present invention is to cover the modifications and variations of this invention provided they come within the scope of the appended claims and their equivalents.

The invention claimed is:

1. A power supply system, for wire electric discharge machining, which supplies a current pulse to a machining gap formed between a wire electrode and a work piece, comprising:
   a first power supply circuit including a first DC power supply and a current limiting resistor that is series-connected to the first DC power supply and limits a current flowing through the machining gap, and applying a voltage, which induces an electric discharge, to the machining gap;
   a second power supply circuit including a second DC power supply and a coaxial cable, and supplying the current, which is applied to the electric discharge machining, to the machining gap, wherein a first conductor of the coaxial cable connects between the second DC power supply and the wire electrode, and a second conductor of the coaxial cable connects between the second DC power supply and the work piece;
   a blocking diode that is series-connected between the coaxial cable and the machining gap, for suppressing a current flowed from a floating capacitor in the coaxial cable to the machining gap;
   a container that has a contact surface contacting with the blocking diode and contains a cooling liquid; and
   a machining tank having a through hole, a mounting plate that is disposed in the machining tank and for fixing the work piece and a conductor block that passes through the through hole and electrically connects to the mounting plate, wherein the blocking diode is mounted to the conductor block.

2. The power supply system for wire electric discharge machining according to claim 1, further including a snubber circuit parallel-connected to the blocking diode.

3. The power supply system for wire electric discharge machining according to claim 1, further including a silicon paste disposed between the blocking diode and the contact surface.

4. The power supply system for wire electric discharge machining according to claim 1, wherein the blocking diode has a flat plane, and the contact surface has an area to a degree that makes contact with an entire area of the flat plane.

* * * * *